April 2, 1935.　　　　　D. BURKS, JR　　　　　1,996,274
MEANS AND METHOD FOR FREEZING A CLEAR ICE BLOCK
Filed June 19, 1930　　　3 Sheets-Sheet 1
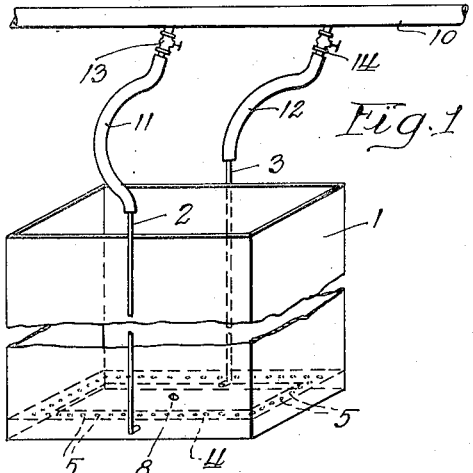
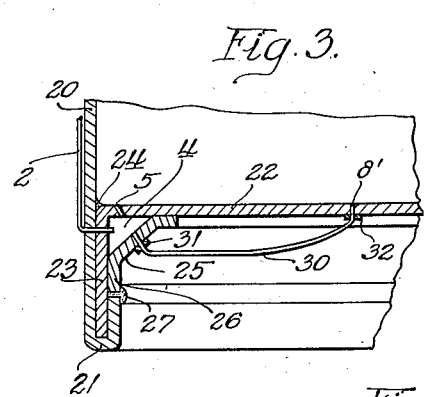
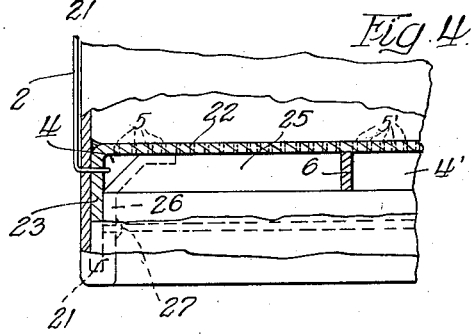
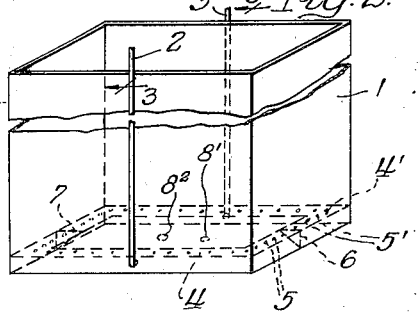
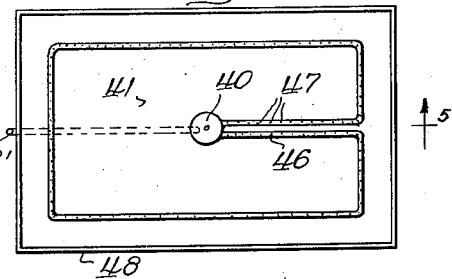
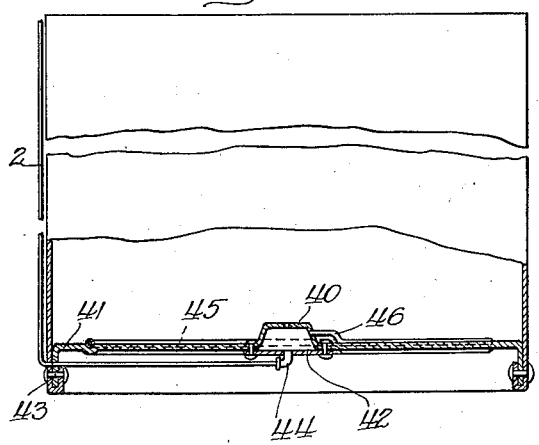
Inventor:
Dana Burks Jr.
By [signature] Attys.

April 2, 1935.  D. BURKS, JR  1,996,274
MEANS AND METHOD FOR FREEZING A CLEAR ICE BLOCK
Filed June 19, 1930  3 Sheets-Sheet 2
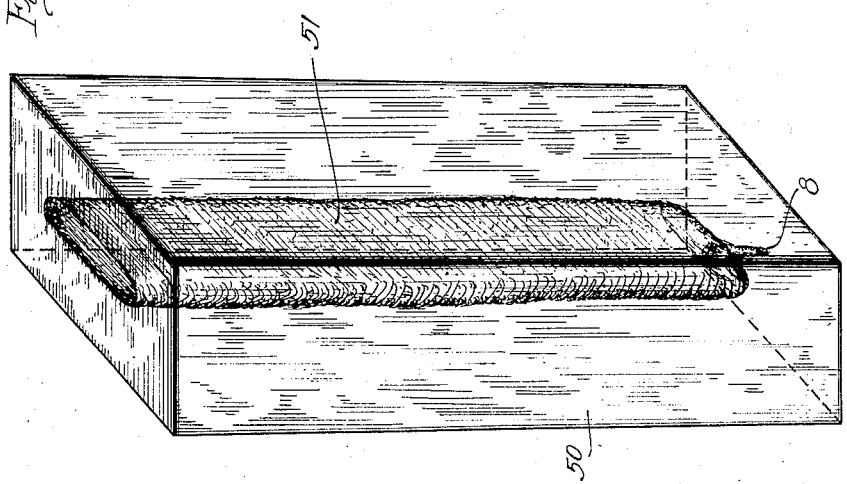
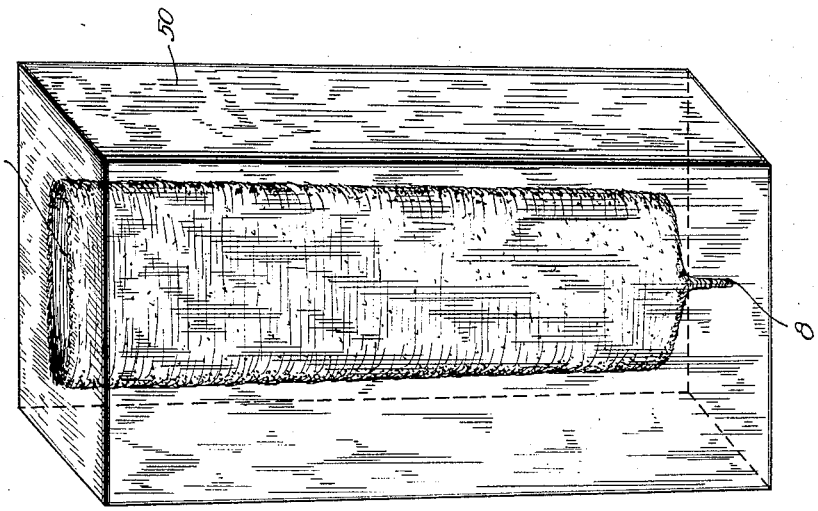
Inventor:
Dana Burks Jr.

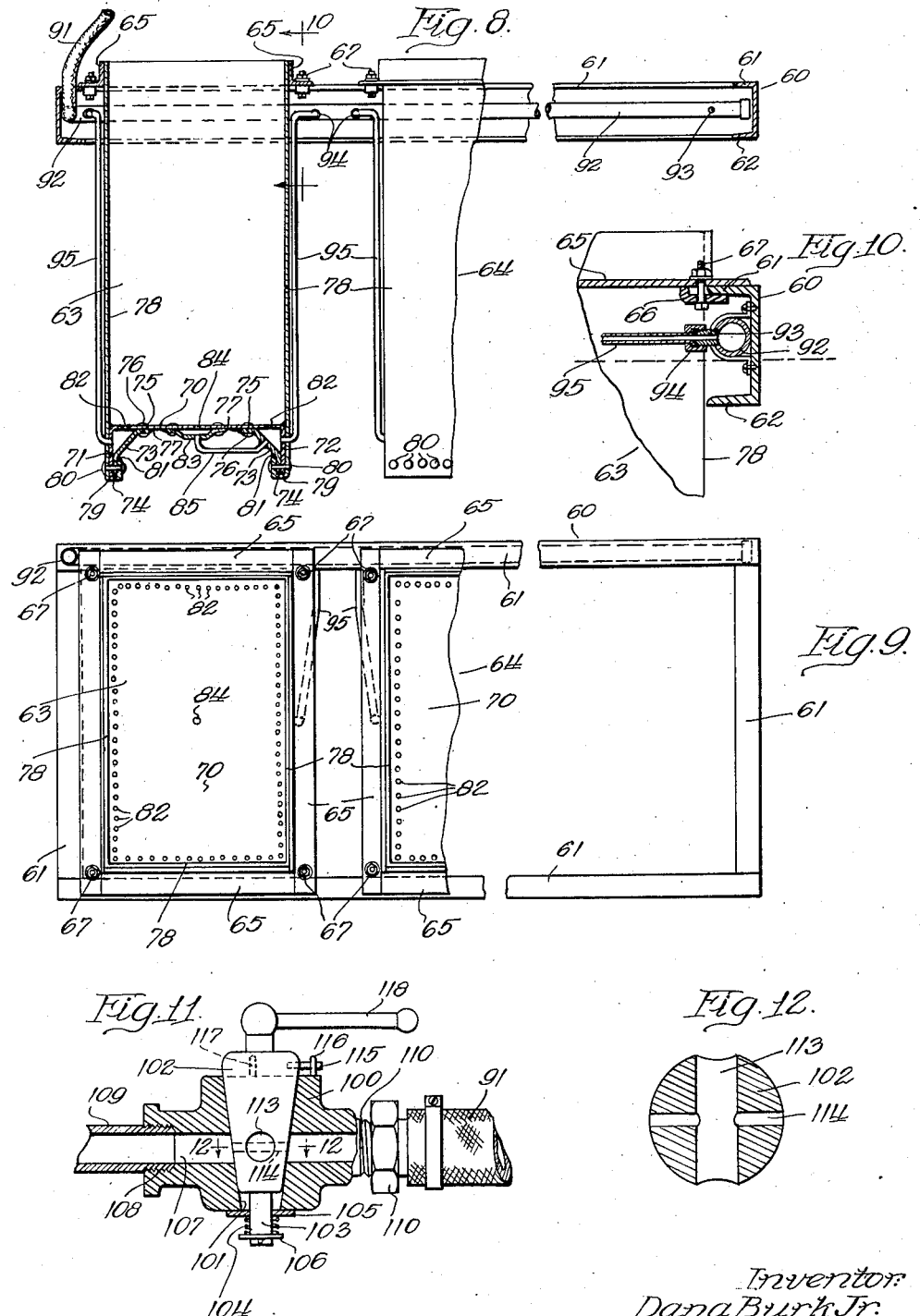

Patented Apr. 2, 1935

1,996,274

UNITED STATES PATENT OFFICE 1,996,274

MEANS AND METHOD FOR FREEZING A CLEAR ICE BLOCK

Dana Burks, Jr., Urbana, Ill., assignor to Board of Trustees, University of Illinois, Urbana, Ill., a corporation of Illinois Application June 19, 1930, Serial No. 462,221

21 Claims. (Cl. 62—159)

This invention relates to a method of and means for freezing a clear ice block.

Artificial ice, to be marketable, must be produced in clear, transparent blocks, and the production of such blocks from a supply of raw water is oftentimes a difficult matter. Raw water such as is obtained from the city water supply in most localities contains an appreciable quantity of dissolved salts, which when sufficiently concentrated due to the separation of water as ice finally cause the ice being formed to appear opaque.

In the manufacture of artificial ice, it has heretofore been the practice to follow one of two procedures in an attempt to secure ice blocks that are clear and transparent. The one method involves treating the water to remove the salts from solution, or at least to transform the salts in solution from their natural form to a form less damaging to the production of clear ice. This method, while it is most generally quite satisfactory, involves a chemical treatment of the water supply, or a distillation of that water, and the method is therefore expensive of performance, frequently so expensive as to render it economically impractical.

The other method practiced heretofore involves agitating the water while it is being frozen, thereby preventing undue concentration of the dissolved salts at the surface of the growing ice surface, and the method under favorable conditions produces ice blocks that are fairly satisfactory.

In the practice of this method heretofore, air has been admitted to the can containing the water to be frozen by a pipe suspended in the middle of the can and extending to a point within a few inches of the bottom. Air admitted to the water to be frozen through this pipe rises in large bubbles thus agitating the water. When a can of water is immersed in the cooling medium, usually brine, a shell of ice is rapidly formed at the sides and bottom; this shell forms so rapidly that the salts dissolved in the unfrozen liquid tend to concentrate unduly at the surface of the ice layer. This concentration causes the cake of ice thus formed to appear opaque, and consequently the method is not entirely satisfactory. As soon as a sufficient layer of ice has formed at the sides and bottom of the ice cake to reduce the rate of crystal growth, admission of air centrally to the core remaining unfrozen agitates it sufficiently to produce a fairly satisfactory block of ice in most instances.

My improved method continues the agitation of the water adjacent the edges of the tank only until the shell is formed to such a point that the rate of cooling is sufficiently decreased, at which time this air supply is shut off and an air supply brought to the central portion of the tank is provided to agitate the liquor in the core.

As the can freezes in from the outside the shell becomes thicker and the liquor in the core becomes more highly concentrated in dissolved salts, approaching the critical concentration value at which formation of clear ice is impossible.

In the practice of the method of my invention, when the core water has reached this critical concentration value, it is withdrawn and the core refilled with raw water, which is agitated and eventually frozen to produce a solid block of ice.

By the practice of this method, the block of ice is entirely transparent save for a small core in its center, which core freezes last and is composed of a rather highly concentrated salts solution which results in the formation of opaque ice.

By the proper practice of my invention, this core of crystalline ice is so small as to be practically unobjectionable and the block of ice thus resulting is for the most part entirely clear and transparent and highly marketable.

In the commercial practice of my invention it is imperative that the amount of compressed air used to agitate the liquid in the can be regulated closely so that the cost of production will not be increased due to the use of an unnecessary amount of air. Furthermore, it is preferable that the can in which the liquid is frozen be assembled in the usual "basket" so that a plurality of them may be handled as a unit. This construction reduces the handling cost, and, furthermore, permits a single air hose from the air header to supply a plurality of individual cans. To permit accurate regulation of the amount of air delivered to the cans in a basket I have equipped this single air connection with a special valve which can be conveniently regulated by inexperienced labor to accurately control the amount of air delivered to the basket.

The objects of my invention will be best understood from a reading of the detailed description and claims which follow, reference being had to the accompanying drawings in which a preferred embodiment of the invention is shown by way of example and in which:

Figure 1 is a diagram illustrating an embodiment of my invention;

Figure 2 is a similar diagram indicating a preferred embodiment of the invention;

Figure 3 is a cross-sectional view taken substantially along the line 3—3 of Figure 2 looking in the direction of the arrows;

Figure 4 is an end view of the tank shown in Figure 2 with a part of the side wall broken away to show the interior construction;

Figure 5 is an elevation view partly in section along the line 5—5 of Figure 6 showing a modified form of tank;

Figure 6 is a plan view of the tank shown in Figure 5;

Figures 7 and 7a are perspective views of a partially frozen block of ice;

Figure 8 is a fragmentary elevational view partly in section of basket employed in the commercial embodiment of my invention;

Figure 9 is a plan view of that basket;

Figure 10 is a detailed view showing a method of attaching the cans to the basket framework;

Figure 11 is a cross-sectional elevational view through the control valve employed in the commercial practice of my invention; and Figure 12 is a cross-sectional view taken along the line 12—12 of Figure 11 showing the details of construction of this valve.

My invention relates to a solution of the difficulty encountered in producing clear transparent blocks of ice from raw water which invariably contains dissolved salts. When such solutions are cooled a temperature is reached at which a solid phase, pure solid water or ice, separates from the solution. With the separation of ice the concentration of salts dissolved in the unfrozen mother liquor increases. The concentration of this material may reach such a point that the solid phase separating no longer consists of pure solid water but rather of a mixture of ice and solids salts, the so-called eutectic mixture. The occurrence of a solid phase no longer homogeneous causes the solid phase subsequently formed to appear opaque. At the same time it has been shown to be entirely possible for opaque ice to form from a solution in which the concentration of dissolved salts lies above that occasioning the eutectic mixture. This necessitates the additional assumption that the environment from which the crystal forms may affect its optical properties, opacity resulting from diffraction of the light passing through the ice cake. It has been determined that for every solution there exists a definite concentration of salt beyond which the formation of opaque ice invariably results. This critical concentration is a specified property of the solution and depends upon the composition of the various dissolved constituents.

Opacity in raw water artificial ice is therefore seen to result from (1) the formation of an eutectic salt mixture as solid phase or (2) the formation of a pure ice crystal layer the optical properties of which have been so affected by the environment from which it formed that light passing through it is materially diffracted.

In actual operation the water to be frozen, in sheet metal cans, is immersed in a concentrated salt solution, a brine, the temperature of which is mechanically maintained at a point considerably below the freezing point of water. The brine temperature is held as low as possible in order to speed the freezing operation. The water in the metal container is therefore subjected to a high rate of cooling on first entering the brine. A layer of ice quickly covers the four sides and bottom of the container. Since the ratio between the heat conductivities of ice and steel is $$\frac{.004}{.114}$$

or 0.03 the rate of cooling rapidly decreases as ice is progressively formed.

As the temperature of a solution falls to the point where a solid phase separates, two opposing tendencies are in operation, namely, the rate of cooling and the normal diffusion of the dissolved salts. A high rate of cooling resulting in the separation of ice tends to locally concentrate salts dissolved in the unfrozen mother liquor. As the result of the concentration gradient thus established normal diffusion tends to reestablish a homogeneous solution. However, where great difference exists in these two rates, as when the can is first immersed in the brine, the normal rate of diffusion must be reinforced.

In practice this is accomplished by means of agitation afforded by blowing air under pressure into the solution at a central point located near the bottom of the can. Air agitation is seemingly alone available in this case as the physical conditions under which the agitation must be operated during the different stages of the freezing operation necessitates a mechanical application which is both positive and flexible and yet readily disengaged from the finally frozen cake of ice. If the agitation thus afforded is not sufficient to effectively reinforce the rate of diffusion the obvious result is that at the outer sides and bottom of the ice cake, where the rate of cooling has been greatest, opaque ice will result due to the fact that here, locally, the critical concentration of dissolved salts occasioning opacity has been reached. The higher the initial concentration of dissolved salts, or in other words, the nearer the initial concentration is to the critical concentration, and the lower the brine temperature, the greater is the necessity for agitation. A point is finally reached, however, where air agitation as previously employed in practice is unable to prevent the formation of opaque ice at the sides and bottom of the ice cake. Resort must therefore be made to a more efficient application.

As ice progressively forms in from the sides and bottom of the ice can the temperature gradient existing between the surface of the solid phase and the water to be cooled gradually decreases. At first this phase merely consists of the thin metal layer of the can wall. The heat capacity of metal being high a rate of cooling results which is exceedingly great as compared to that resulting where the solid phase consists of the thin metal wall upon which is superimposed a gradually increasing layer of ice. Thus the heat conductivity of the solid phase rapidly decreases, as does the rate of cooling. Therefore in any case the need for exceedingly efficient air agitation only lasts until a sufficiently thick layer of ice has been formed to lower the rate of cooling to a point where a homogeneous mother liquor may be maintained by normal air agitation. Under these conditions opacity will only result when all of the homogeneous core water remaining unfrozen has reached the critical concentration occasioning this condition. At this point the core water may be removed by means of a suction pump and replaced by a fresh supply of the water originally used. When the critical concentration is again reached the unfrozen core water may again be removed if the volume of water still remaining unfrozen at this point warrants such procedure. Whether the removal of a second core becomes necessary depends upon the nature and concentration of the salts originally dissolved in the solution.

In those cases where the initial salt concentration of the water to be frozen is high and where the brine temperatures are low, it is therefore evident that greater and more efficient air agitation must be applied, and also the specific point where this extra agitation must be applied exists at the immediate boundary between the solid and liquid phases. Furthermore, the need of extra agitation ceases as soon as the rate of cooling has been decreased by the formation of a sufficiently thick layer of ice. In the course of my investigation into the methods of treatment of water for ice manufacture, I have devised a method in which these fundamental requirements are effectively incorporated.

Previous construction in ice cans has followed two distinct trends. In the first the air is allowed to enter the can through an auxiliary metal tube. This tube, suspended in the can by means of an auxiliary support, delivers the air to a point centrally located about six inches above the bottom of the can. The tube is then either allowed to freeze up in the ice cake, to be subsequently removed by means of a so-called thawing needle carrying hot water and capable of passing down through the air tube, or is removed before the cake has finally frozen solid. In the second method, the air tube is made an integral part of the can, air entering the can through a single hole located at the bottom, either at one side or in the center of the bottom.

Agitation resulting from such application is evidently characterized by the fact that the air passes to the surface in large bubbles and the active zone of agitation derived from such passage is small. At best the zone of agitation probably exists in the form of an inverted cone whose apex corresponds to the point of entry, thus leaving a considerable area at the bottom in a comparatively unagitated condition.

My new method contemplates violent agitation of the liquor adjacent to the walls of the can during the initial stages of the freezing, this being accomplished in practice by constructing an air header in the bottom of the can and preferably locating it immediately adjacent to the side walls of the can. In Figure 1, I have illustrated an arrangement of this kind. The sheet metal can, diagrammatically indicated at 1, is provided with air pipes 2 and 3 preferably located on the sides of the can and extending to the bottom of it. These air pipes communicate with an air header, indicated generally at 4, located in the bottom of the can and containing a plurality of holes or ports 5, located as near the edge of the can as it is possible to locate them. In a commercial embodiment of the invention, with the can 1 of standard size now employed in the manufacture of artificial ice, the openings 5 are preferably about $\frac{1}{32}$ inch in diameter and are located approximately one inch apart. Obviously, the diameter of the ports 5 and the distance between adjacent ports 5 can be modified to meet existing conditions within the teachings of my invention. Furthermore it is not always desirable to have the air pipes 2 and 3 both communicate with the header 4 and in some instances I contemplate connecting the pipe 2 to the central port 8 and the pipe 3 to the header 4. By such an arrangement a wider range of control of the air supply to the can, can be achieved.

Preferably, as is illustrated in Figure 2, the air header 4 is divided into two sections by suitable dams 6 and 7, with the result that the front half of the header 4 is supplied with air by the air pipe 2, and the back half 4' of this header is supplied through the air pipe 3. This arrangement results in a more uniform discharge of air from the ports 5 in the header 4, and 5' in the header 4', since the pressure in the header can be maintained more uniform.

Air pipes 2 and 3 are connected to an air supply 10 by suitable flexible connections such as the hoses 11 and 12, respectively. Suitable valves 13 and 14 are interposed in this air connection to regulate the flow of air to the can.

In Figure 3, I have illustrated a preferred method of constructing a can embodying the air header 4 diagrammatically illustrated in Figures 1 and 2. The construction of this can follows the standard practice of forming a U-shaped flange 21 on the bottom of the side walls 20 of the can, forming the bottom 22 with a downwardly projecting flange member 23 which registers with the flange 21 and is fastened therein either by riveting, welding, soldering or a combination of these processes. Preferably the junction of the side wall 20 and the bottom 22 is filleted with solder at 24 to form a smooth rounded corner from which the frozen ice can be easily withdrawn.

The air header 4 is attached to this flanged bottom member 22 and comprises a sheet metal member 25 embracing the under side of the bottom plate 22 and the inside of the flange 23 of that plate. The member 25 is attached to the bottom plate in any preferred manner such as by soldering, or soldering and riveting, and forms an air tight header running completely around the bottom of the can adjacent the outside walls 20. The lower edge 26 of the member 25 abuts against the top edge of the flange 21, and if desired this junction may be soldered as indicated at 27; however this procedure is not in all instances necessary.

The air pipe 2, suitably attached to the outside surface of the side walls 20 of the can, projects through that wall and through the flange 23 into the interior of the header 4. Ports 5 are formed by drilling holes diagonally through the member 25 and the bottom of the can. The diagonal drilling of these holes facilitate manufacture of the can and, in addition, serves to position the point of entry of air into the interior of the can nearer to the interior surface of the side walls 20 of the can. The holes drilled in the header wall 25 are subsequently filled in any preferred manner, as by solder, to block them and prevent the escape of air therefrom. The presence of these holes in alignment with the ports 5 is useful in the event that the ports become blocked, since in order to clean the ports it is only necessary to remove the plug of solder from the companion hole in the header wall 25 and to extend a drill through that hole and the blocked port 5. After this operation the hole in the header wall 25 is of course refilled with solder to prevent leakage of air.

During the final stages of freezing, as will presently appear, air is admitted to the can through a central opening 8 to agitate the core of liquor encased within the shell of ice. In Figure 3, I have illustrated a method of supplying air to this central port 8, which method employs one of the holes drilled in the header member 25. A suitable pipe 30 is registered with this hole in the header and with the port 8, being held thereagainst in any preferred manner such as by soldering at points 31 and 32 respectively. This pipe 30, preferably a small copper or brass pipe of approximately $\frac{1}{8}$ of an inch in diameter, taps air from the header 4 and conducts it to the port 8 from which it is allowed to escape into the central portion of the can.

In Figure 4, I have illustrated the positioning of the walls 6 and 7 within the header 4 to divide that header into two sections. This view, an end view of Figure 2 with the end wall 20' broken away to show the interior construction of the air header, clearly shows the block 6 interposed in the header 4 in approximately the middle of the end of the can, thus dividing that header into two sections 4 and 4'. This dividing wall 6 may be a sheet metal member, or a lump of solder placed to completely block the header 4.

In actual practice, with the can 1 of standard size, the diagonal height of the header from the junction of the bottom plate 22 and its flange 23 to the flat surface of the header member 25 need not be more than one-fourth of an inch, and the blocking of the header by a lump of solder 6 is therefore a relatively simple matter. Of course, the dimensions of the header may be varied within the teachings of my invention.

In Figures 5 and 6, I have illustrated a different embodiment of my invention. In this embodiment, the air pipe 2 communicates with a central chamber 40 formed as a boss or depression pressed into the bottom plate 41 of the can. A cover 42 riveted or otherwise suitably attached to the bottom surface of the member 41 closes this chamber 40. The air pipe passes through the flange 43 which joins the bottom to the side wall of the can and is connected to the chamber 40 by a suitable pipe connection 44 attached to the closing plate 42.

The bottom plate 41 is provided with a depression or boss 45 into which the air pipe 46 is positioned and fastened in any preferred manner such as by soldering. The air pipe 46, preferably a copper or brass pipe of approximately ⅛-inch in diameter, is provided with a plurality of evenly spaced holes or ports 47 through which the air supplied to the chamber 40 by the pipe 2 is permitted to escape into the can. The pipe 46 is disposed around the edge of the can adjacent to its outer walls, so that the liquid in the can is agitated at all points around those walls. The mechanical difficulties encountered in constructing a can of this type prevent the location of the pipe 46 immediately adjacent to the side walls 48 of the can, since in the course of manufacture of the can the small port 47 in the pipe would be filled by solder when the side walls 48 are soldered to the bottom 41. For this reason, an appreciable space of several inches must intervene between the pipe 46 and the side walls 48 of the can, and for this reason, the embodiment of the invention shown in Figures 5 and 6 is less desirable than that shown in Figures 1 to 4, inclusive.

The operation of the cans shown in Figures 1 to 4 is as follows. The can is filled with water to be frozen and then sufficient air is forced into the bottom header 4 to cause an evenly distributed chain of bubbles to rise from all of the ports 5. Effective agitation is thus afforded to the solution at the extreme sides of the can adjacent to the air header 4, and at points at which the greatest rate of cooling will occur as soon as the can is immersed into the brine tank. Similarly, air supplied to the air header 3 is allowed to escape from the ports 5' in the header 4' to agitate the liquid at points adjacent to the other side walls of the can. The first formation of ice thus occurs from a solution wherein the increased concentration of salt occasioned by the separation of solid water is being rapidly dissipated by the normal diffusion tendency aided by an active and positive mechanical agitation. With sufficient air passing up through the perforated headers no marked increase in concentration should be possible, and subsequent ice formation will occur from an unfrozen mother liquor which is almost completely homogeneous.

As ice forms in from the side, decreasing the heat conductivity of the total solid phase, a point is finally reached at which the rate of cooling has been so materially reduced that opaque ice formations can be prevented with not only much less air agitation but also agitation applied from a hole centrally located in the bottom of the can. When the volume of air is decreased the resistance offered by the ice layer to air issuing from the holes 5 in the header 4 and from the old pipe line in the header 4' is great enough to effectively plug these holes and thus prevent further air agitation from this source. All of the air supplied to the headers 4 and 4' must therefore pass up through the centrally located ports 8' and $8^2$ connected to these headers, respectively. This continues to supply sufficient agitation to the core water throughout the remainder of the freezing period. When the ice forming in from the four walls and up from the bottom finally meet, the air agitation is automatically stopped. The cake of ice is then completely frozen and the can is placed in a dipping vat containing warm water and the ice cake thus melted slightly at the sides and bottom so that it can be removed from the can. In this thawing operation, the air headers are also cleared of any ice which may have formed in them due to an influx of water when the air supply was reduced, this thawing action will also continue when the empty can is refilled with the next supply of water to be frozen. The solution to be frozen is usually supplied to the can at room temperature which probably averages 15 degrees centigrade above the freezing point of the solution and therefore contains sufficient available heat to melt any ice still remaining to clog the headers. In order to provide for accurate and simple adjustment of the air pressure applied to the headers 4 and 4' through the valves 13 and 14, respectively, these valves are preferably constructed to have two ports, a large one and a small one. During the initial stage of the freezing, that is, while violent agitation is applied to the water to prevent the formation of the opaque shell, the valves 13 and 14 are set so that air passes from the header through the large ports in these valves and thence through the air connections 11 and 12 into the respective headers. At the end of this period, when it is desired to reduce the amount of air supplied to the headers to thereby permit the ports 5 and 5' to become frozen over, valves 13 and 14 are turned so that air is supplied through their smaller ports, this arrangement automatically reducing the pressure in the headers to the proper value.

The duration of time of applying high pressure air to the headers to cause violent agitation at the surface of the growing ice layer is determined by two principal factors, first, the cost of compressed air in large quantities, and, second, the concentration of the dissolved salt in the raw water.

In fact it is undesirable to continue the agitation of the liquor from the outer header any longer than is necessary to produce a transparent ice cake. When the cake finally freezes up, the final channel through which air has passed will freeze as a solid foam and will thus appear opaque. If the supply of air through the peripheral ports 5 is continued too long and a shell of ice permitted to form too far inwardly of the point at which the air rises to the surface of the liquid, channels will be formed in the ice, which channels will subsequently freeze as foam, with the result that opaque streaks will be formed in the cake adjacent its outer surfaces. If the supply of air through these ports 5 is cut off at the earliest possible time, the size of these streaks is materially reduced if not completely eliminated and a more transparent cake of ice results.

After the shell of ice has been formed and the air supply diminished so that the air for agitation enters the can only through the central ports 8 or 8¹ and 8² in the preferred embodiment of the invention, the block of ice assumes a form substantially like that shown in Figure 7. The shell 50 contains a central unfrozen portion or core 51 which is centered in the can and centered with respect to port 8 through which air is admitted. This core 51 is filled with unfrozen mother liquor, the salt concentration of which increases as the dimension of the cone decreases. Since the shell of ice 50 is of appreciable thickness, the rate of freezing of the liquor in the cone 51 is low, and consequently the amount of air required to properly agitate it is correspondingly low. A small amount of air admitted through the ports 8¹ and 8² will therefore prevent the formation of opaque ice up to the point when the homogeneous core water has reached the critical concentration value which causes opaqueness. Since this critical concentration is in each case a specific property of the solution to be frozen the amount of core remaining when this critical condition is reached will vary among the different water sources and will depend upon the initial concentration and composition of the dissolved salts.

It is the common practice to discard this core water when the critical concentration is reached. This may be accomplished by withdrawing the water through a hose connected to a suitable pump, thus emptying the core. The core is then filled with fresh mother water of low salt concentration, this water being frozen as the process continues.

The water withdrawn from the core 51 in the ice cake is therefore very near its freezing point and therefore possesses properties which should be advantageously utilized to perform some cooling operation in the refrigerating system. This point becomes especially important where, because of the high initial concentration of salt in the water, the amount of core water to be removed becomes relatively large. In the past, ice plant operators have seemingly hesitated to remove large volumes of core water under the supposition that to do so would involve too great a loss in power. In the course of my investigation, I have found that the removal of a core solution when the water remaining unfrozen represents twenty per cent of that originally present, and replacing this solution by water at a temperature of twenty degrees centigrade above the freezing point, represents a power loss of only 2.5%, which in turn is only 0.4% of the total cost of production. These figures presuppose no attempt to utilize this core water for cooling purposes by means of heat exchange and assume that the water is to be totally discarded. On the basis of a plant having a capacity of 100 tons of ice per day the amount of water available at zero degree centigrade resulting from the removal of 20% core is approximately 5,000 gallons. The cooling capacity of this volume of cold liquid could and should be utilized in heat exchange. For example, it might be employed to cool the raw water that is subsequently to be used in filling the cores or refilling the cans for the formation of other blocks of ice. Another point at which it could be effectively applied would be in cooling the liquid ammonia which leaves the ammonia condensers before it reaches the expansion chambers or the ammonia brine coils, since the efficiency of the ammonia refrigeration cycle depends upon the temperature at which the liquid ammonia enters the expansion or evaporation stage. No such utilization of core water removed in the course of the freezing operation has seemingly been made in the past operating procedure.

In removing core water, especially when the volume of the solution removed is large, it has been observed that quite frequently the air agitation stops and cannot be made to start again when the core is refilled. It has been found that the small amount of air sufficient for agitation at this point is not sufficient to keep the air channels open when the unfrozen solution is completely removed, and that they become frozen over. If during the removal of the core water, however, an extra amount of air for agitation is momentarily used, it has been found that no such freezing up of the channels 8¹ and 8² results. When the core water is refilled with fresh solution a smaller volume of air again becomes sufficient. The adjustable valves 13 and 14, previously referred to, again are of utility, since they can be turned to their larger ports to supply a large quantity of air while the core 51 is being emptied and refilled, and can subsequently be turned to the position in which they supply a smaller quantity of air to agitate the fresh water core that has just replaced the highly concentrated solution which has been withdrawn.

In certain instances, because of the high initial concentration of salt in the raw liquor, it may be necessary to withdraw the core 51 from the ice cake more than once in order to secure a perfectly transparent cake of ice. This practice is contemplated within the teachings of my invention, and is not particularly serious from an economic standpoint particularly if the low temperature of the liquid thus withdrawn is utilized in heat transfer as hereinbefore pointed out.

When the cake of ice finally freezes solid, and the air supply through the ports 8¹ and 8² is finally cut off, a small amount of foam freezes at approximately the center of the cone 51, resulting in slight opaqueness at this point. By proper adjustment of the quantity of air supplied through the central ports and consequent proper agitation of the unfrozen liquor, this amount of frozen foam is small and the resulting opaqueness unobjectionable in the center of the cake.

In the embodiments of my invention shown in Figures 1 to 6 inclusive are certain mechanical features which become objectionable in commercial use of the invention. For example, in Figure 1, I have employed two air hoses 11 and 12 each with a valve 13 and 14, respectively, leading to the one can. In practice, such an arrangement is undesirable because of the large number of valves and hose which must be used to supply air to the freezing liquid. Furthermore, the cans are individual and each must be handled separately to position it in the brine tank.

In Figure 8 I have shown a commercial embodiment of the invention employing the so-called basket construction wherein a plurality of individual freezing cans are supported together on a suitable framework and therefore capable of being lowered as a unit into the brine mixture. In this construction I employ a channel framework 60 formed as a rectangle with the flanges 61 and 62 of the channel disposed inwardly. A plurality of cans 63 and 64 are supported in this frame with their top bands 65 resting on the upper flange 61 of the channel. The cans are suitable locked in position in the frame in any preferred manner such as by the clamp 66 and bolt 67 shown in Figure 10.

The cans 63 and 64 are constructed in the previously explained manner, but contain a few additional mechanical features which render them more satisfactory for continued commercial use. The bottom member 70 is provided with the downwardly depending flanges 71 and 72 and the air header wall 73 is provided with a flanged portion 74 which registers with the flange 71 of the bottom member. The portion 74 extends to the bottom of the flange 71 and is attached thereto by an air tight seam formed by soldering or welding. The header member 73 also contains a flange portion 75 resting against the bottom side of the bottom member 70 to which it is attached by rivets 76 and by solder 77 to likewise form an air tight joint. It will be noted that in this embodiment the header member 73 is rigidly attached to the bottom member independently of the solder and that the solder is employed only to form an air tight joint, this construction obviously being more permanent and capable of withstanding more rough handling than the previously explained constructions.

The side members 78 of the can are provided with the U-shaped bottom member 79 as before, this bottom member extending over the flange 71 and the portion 74 of the header member. The two bottom members are thus attached to the side by rivets 80 extending through four thicknesses of metal, a construction which is rigid and permanent. Fillets 81 are formed of solder to provide a smooth corner on the inside of the tank.

In the construction of this type of can, the air ports 82 are drilled from the top side of the bottom member 70 prior to its assembly with the side members 78, this construction eliminating the necessity of drilling through the header wall 73 and subsequently blocking such holes with plugs of solder which might work loose during the rough handling to which the cans are subjected.

In this embodiment of my invention the central air header is likewise formed by riveting a plate 83 to the head portion of the bottom member 70 of the can and soldering around the edge of that member to form an air tight connection. The central port 84 is located as before and air supplied to it through a pipe 85 connecting the header member 83 to the header member 73 at the side of the can.

This construction, while it embodies the principles hereinbefore set forth, contains obvious refinements which minimize the possibility of air leakage and resultant necessity of repairing the can to maintain it in service.

The basket construction shown in Figures 8 and 9 permits me to eliminate the large number of air connections extending from an air header to the cans in the brine tank, replacing this plurality of air hose by a single air hose 91 which is connected to an auxiliary air header 92 located within the channel space and thereby protected from injury. Outlet pipes 93 are attached to this air header 92 and terminate in a coupling member 94 to which the air pipes 95, located on the outside surface of the cans and communicating with the air headers of the cans, are connected.

The air pipes are located between the cans and within the area defined by the channel framework and are therefore protected from mechanical injury during the handling of the basket. If it is desired to use a can of the type in which the central port 8 is supplied by a separate air pipe, as is illustrated in Figure 1, a second header similar to 92 can be added and connected to be supplied with air by the hose 91, or if desired by a separate hose. A single valve located between the air hose 91 and the air supply header controls the pressure and quantity of air supplied to the cans in the basket. If separate headers are employed and supplied by a single air hose, an addition valve will of course be inserted in the connection between these headers so that the air pressure in them may be controlled independently.

This valve is shown in detail in Figures 11 and 12, and comprises a body 100 containing a central conical shaped opening 101 into which the valve gate 102 is positioned. The outer surface of the gate 102 is accurately formed to fit within the conical opening 101 in the body, and is lapped therein to form an air tight joint. A projecting stud 103 is provided in the bottom of the gate member 102 and a coil spring 104 positioned around this and made to bear against washers 105 and 106 to keep the gate tightly seated in the valve body.

The valve body contains a transverse belt 107 in one end 108 of which are internal pipe threads by which the valve is connected to a suitable air supply pipe 109. On the opposite end of the body 100 is an external pipe thread 110 upon which a collar nut 111 is threaded to attach the air hose 91 to the valve.

The gate member 102 contains a large duct 113 and a small duct 114, these two ducts being located at right angles to each other. A stop pin 115 carried by the gate member 102 strikes against corresponding pins 116 and 117 to limit the movement of the gate to a quarter turn, this movement being facilitated by the handle 118 conveniently located on the top side of the gate. When the stop pin 115 strikes against the pin 116 the gate is positioned so that air entering the valve through the pipe 109 flows through the duct 107 and the small gate duct 114 thence out through the air hose 91, and at this setting of the valve the minimum amount of air is supplied to the basket. When the handle 118 is turned a quarter of a turn to bring the stop pin 115 against the stop pin 117, duct 114 in the gate is closed off and duct 113 brought into registration with the body duct 107, thereby permitting a larger amount of air to flow through the valve into the air hose 91.

The cross-sectional areas of the gate ducts 113 and 114 are accurately formed so that the quantity of air driven through the valve responsive to the existence of a particular air pressure in the pipe 109 is accurately determined. Since the amount of air required varies with the conditions of the raw water the size of these ports must of course be varied, but when once determined will be constant for a given type of raw water. The valve having been constructed to permit this correct amount of air to flow through the basket during the freezing operation can be operated by inexperienced and consequently inexpensive help to accurately regulate the air supply. For this reason I have found that a valve of this type is decidedly preferable to a gate valve which obviously requires more intelligent manipulation to properly regulate the amount of air admitted to the basket.

In the commercial embodiment of the invention herein disclosed, it has been found that clear, marketable ice can be produced from raw water of comparatively high salt concentration at a reasonable cost, the process permitting the production of this ice at a lower cost than is possible through treatment of the water chemically prior to freezing it.

The process herein outlined is capable of modification within the teachings of my invention, and I am not therefore to be limited to the specific disclosure made by way of example only.

Having thus complied with the statutes and herein described a preferred embodiment of my invention, what I consider new and desire to have protected by Letters Patent is pointed out in the appended claims.

What is claimed is:

1. In a can for freezing artificial ice, side members joined together to form a rectangle, a bottom member closing one end of said rectangle, a liquid-tight joint connecting said members, means in said bottom member adjacent said side members for admitting compressed air to the liquid in the can to prevent undue concentration of solute at the solid liquid interface, said means being disabled by the formation of a shell of ice adjacent said members, and other means connected with the first means and operative after the first means is inoperative to admit air into the core of liquid within said shell to prevent stratification of it.

2. A can for freezing cakes of artificial ice comprising side members joined together to form a rectangle, a bottom member closing one end of said rectangle, said bottom fitting within the side members and being disposed up from their lower edges, an air header located beneath said bottom and within said side members, said header connecting with said can by a plurality of ports adjacent to said side members and by other ports centrally located in said bottom, and an air pipe connected to said header and leading upward along the outer surface of one of said side members.

3. A can for freezing cakes of artificial ice comprising a closed bottom plate having downwardly depending flanges, side members surrounding said plate and connected to said flanges to form a water-tight joint therebetween, said bottom plate having a plurality of evenly spaced ports in alignment with and adjacent to said flanges and side members, and means communicating with said ports for conducting compressed air through them into said can adjacent to its side walls.

4. A can for freezing cakes of artificial ice comprising a bottom plate having downwardly depending flanges, side members surrounding said plate and connected to said flanges to form a water-tight joint therebetween, said bottom plate having a plurality of evenly spaced ports adjacent to said flange and side members, a sheet metal member attached to said flange and to said bottom plate adjacent it to form with that plate an air header communicating with said ports to conduct compressed air through them into said can adjacent to its side walls.

5. A can for freezing cakes of artificial ice comprising a bottom plate having downwardly depending flanges, side members surrounding said plate and connected to said flanges to form a water-tight joint therebetween, said bottom plate having a plurality of evenly spaced ports adjacent said flange and side members, and other ports located centrally in it, a sheet metal member attached to said flange and to said bottom plate adjacent to it to form with that plate an air header communicating with said ports to conduct compressed air through them into said can adjacent to its side walls, and means connecting said header to said other ports to conduct air through them simultaneously.

6. A can for freezing blocks of artificial ice comprising a bottom member, side members attached thereto and extending upward therefrom, an air header attached to said bottom member and having ports leading into the tank at points adjacent to said side members, an air connection attached to said header and leading upward on the outside surface of one of said side members, and an air pipe extending from said header to a mid point in said bottom member where it terminates in a port leading into said can.

7. A can for freezing blocks of artificial ice comprising a bottom member, side members attached thereto and extending upward therefrom, a pair of headers attached to said bottom members and having ports leading into said tank at points adjacent to said side members, air connections attached to said headers and leading upward on the outside surfaces of said side members, and an air pipe extending from each of said headers to points near the center of said bottom members where they terminate in ports leading into said cans.

8. A can for freezing cakes of artificial ice comprising a bottom having downwardly extending peripheral flanges, sides surrounding said bottom and attached to it by a liquid tight joint, a boss depressed in said bottom, an air header disposed in said boss, and ports leading from said header into said can.

9. A can for freezing cakes of artificial ice comprising a bottom having downwardly extending peripheral flanges, sides surrounding said bottom and attached to it by a liquid tight joint, a boss depressed in said bottom near said flanges, an air header disposed in said boss and having ports leading into said can.

10. A can for freezing cakes of artificial ice comprising a bottom having downwardly extending peripheral flanges, sides surrounding said bottom and attached to it by a liquid tight joint, a boss depressed in said bottom near said flanges, an air pipe disposed and soldered in said boss and containing a plurality of holes forming ports leading into said can.

11. A can for freezing cakes of artificial ice comprising a bottom having downwardly extending peripheral flanges, a flanged plate attached to said bottom and its flanges to form a triangular air header beneath the bottom, said bottom containing holes leading into said header, side members disposed outside said bottom flanges and having a U-shaped section extending under and inside said flanges and plate, and rivets extending through said U section, flange and plate to fasten the bottom and sides together.

12. A basket for freezing ice cakes comprising a rectangular frame composed of channel members disposed with their concave faces inwardly of the frame, a plurality of cans mounted in said frame, air connections on each of said cans, an air pipe disposed in one of said frame members, said connections extending from said pipe to each of said cans, and an air hose leading from said pipe outwardly of said frame.

13. A basket for freezing ice cakes comprising a rectangular frame, a plurality of freezing cans rigidly attached to the frame, an air pipe disposed between one of the members of said frame and said cans, an air connection leading from each can to said pipe, and an air connection leading from said pipe outwardly of said frame.

14. A basket for freezing ice cakes comprising a rectangular frame, a plurality of freezing cans each having an outwardly projecting rim at its open end, said cans being spaced in said frame and held therein by means engaging the frame and said rims, an air pipe between one of the members of said frame and said cans, an air connection leading from each can to said pipe, and an air connection leading from said pipe outwardly of said frame.

15. A can for freezing ice cakes comprising solid side, end, and bottom members joined together by air tight joints, a plurality of ports in said bottom member adjacent said side and end members, means for conducting air from an air supply to said ports to admit air therethrough into said can, a port located centrally of the bottom of said can, means for conducting air from said supply to said central port, and control means in said conducting means for regulating the amount of air admitted through the ports.

16. A can for freezing ice cakes comprising solid side, end and bottom members joined together by air tight joints, a plurality of ports in said bottom member adjacent said side and end members, an air pipe attached to said member and leading from an air supply to said ports, a port located centrally of the bottom of said can, an air pipe leading to said central port, and control means in said air pipes for regulating the amount of air admitted through the ports.

17. A unitary can for freezing cakes of ice, said can having bottom and side walls, and air inlets within the can, said inlets being adjacent to the bottom and extending along and adjacent to the entire perimeter thereof, the bottom wall of said can having a central opening therein and closing the entire bottom of the can except for the air inlets adjacent the perimeter thereof and said central opening.

18. An ice freezing can having, adjacent to the bottom thereof, side by side air inlet openings in a row parallel and adjacent to a vertical wall of the can and extending from one edge of the vertical wall to the opposite edge thereof, said row of openings being in close proximity to the wall of the can and directing a stream of air along substantially the entire wall.

19. In a freezing process wherein water being frozen in a can is agitated by bubbling air through openings at the bottom of the can, the method of operation which comprises bubbling the air through the water along the entire solid liquid interface at a comparatively high rate upon the initial freezing, and substantially reducing the velocity of air flow through the same openings after the first ice formation along the surface of the can.

20. A can for freezing cakes of ice, comprising a substantially flat bottom and sides, a header beneath the bottom and comprising a part of the can, and communicating air inlet ports between the header and the inside of the can, said ports comprising rows of side by side openings, each row being parallel and adjacent to one of the sides of the can.

21. A can for freezing cakes of ice, comprising a substantially flat bottom and sides, a header beneath the bottom and comprising a part of the can, and communicating air inlet ports between the header and the inside of the can, said ports comprising rows of side by side openings, each row being parallel and adjacent to one of the sides of the can, said header extending along the periphery of the outer side of the bottom of the can and comprising supporting feet for the can.

DANA BURKS, JR.